Patented Mar. 13, 1928.

1,662,404

UNITED STATES PATENT OFFICE.

ERNST STOCKER, OF BASEL, SWITZERLAND, ASSIGNOR TO THE FIRM CHEMICAL WORKS FORMERLY SANDOZ, OF BASEL, SWITZERLAND.

PROCESS FOR INCREASING THE AFFINITY OF ANIMAL FIBERS FOR DYESTUFFS.

No Drawing. Application filed October 27, 1927, Serial No. 229,272, and in Germany November 20, 1926.

In the German specification No. 448,797 a process is described which consists in a treatment of animal fibers with acylating agents, as for instance halides of carboxylic and organic sulpho acids. The fibers thus treated show an increased affinity for all dyestuffs with the exception of the basic colors.

It has now been found, that if animal fibers are treated in an analogous manner with sulphuryl chloride, fibers can be obtained which possess similar properties; they show an increased affinity for all classes of dyestuffs including the basic colors. It is advantageous to carry out this treatment in indifferent organic solvents, for example benzene, toluene, hydrogenized aromatic hydrocarbons, aliphatic hydrocarbons as well as the halogen derivatives of these compounds.

*Examples.*

700 g. of wool are worked for an hour at room temperature in 5 litres of a 7,5% solution of sulphuryl chloride in toluene. The fibers are afterwards thoroughly hydroextracted, washed in water, passed through a soap solution, again washed in water and then dried. The wool thus treated shows a considerably increased affinity for all classes of dyestuffs. The quantity and concentration of the solution as well as the duration of the treatment may be varied to a large extent.

What I claim is:—

1. A process for increasing the affinity of animal fibers for dyestuffs, consisting in treating animal fibers with sulphuryl chloride.

2. A process for increasing the affinity of animal fibers for dyestuffs, consisting in treating animal fibers with sulphuryl chloride in the presence of indifferent organic solvents.

In witness whereof I have hereunto signed my name this 15th day of October, 1927.

ERNST STOCKER.